March 30, 1937.  S. DEBUS  2,075,339
BREAD SLICING MACHINE
Filed Jan. 18, 1934
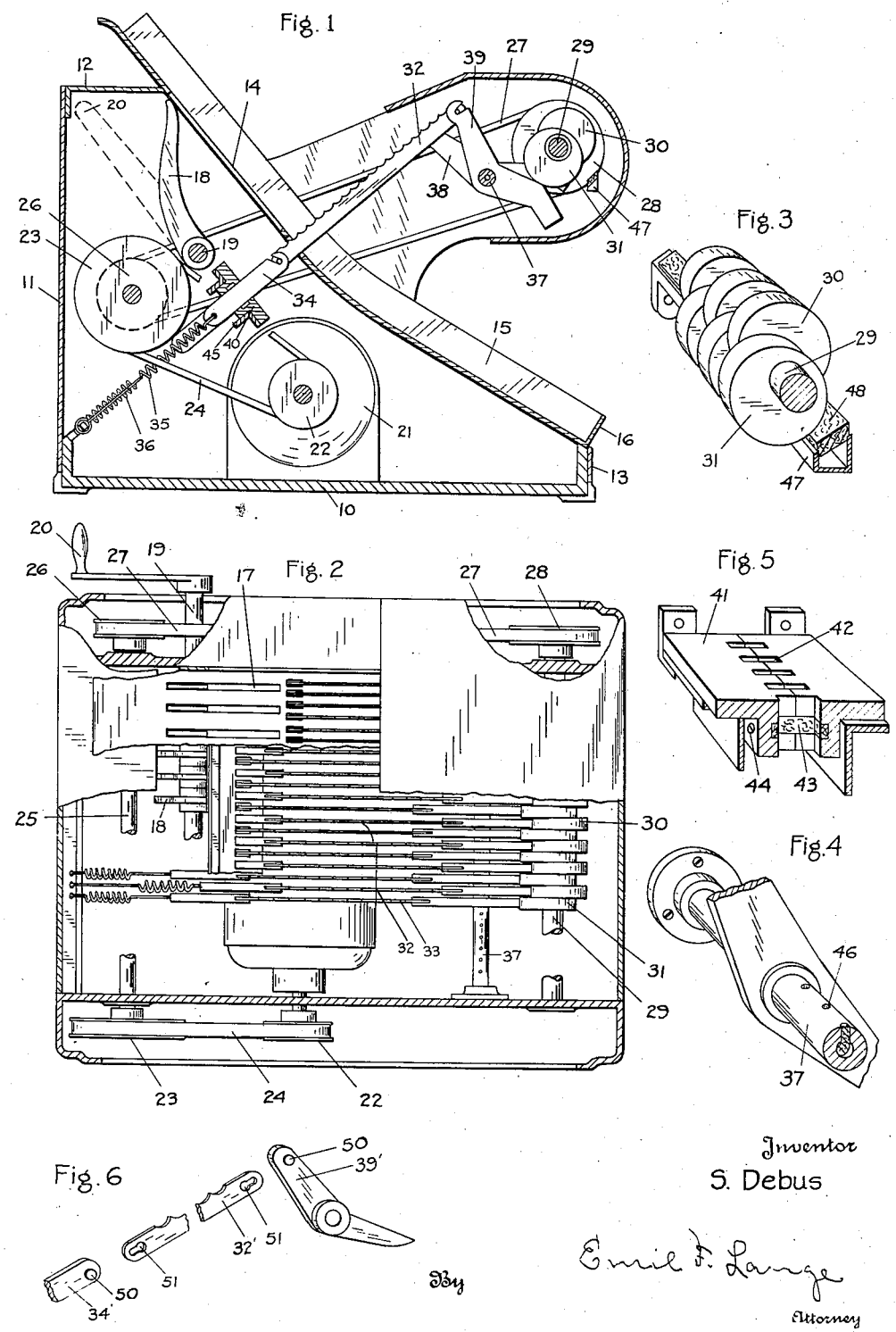
Inventor
S. Debus
By Emil F. Lange
Attorney Patented Mar. 30, 1937

2,075,339

UNITED STATES PATENT OFFICE 2,075,339

BREAD SLICING MACHINE

Sander Debus, Hastings, Nebr.

Application January 18, 1934, Serial No. 707,089

1 Claim. (Cl. 146—153)

My invention relates to bread slicing machines, its primary object being the provision of a machine with a reduced number of parts and with an effective device for reciprocating the knives.

One of the important objects of the invention is the provision of a plurality of knives which are driven throughout the upward stroke by means of a motor and which are retracted by means of tension springs.

Another object of the invention is the provision of a guiding member which minimizes the arcuate movement of the knives resulting from the use of pivoted arms through which the knives are driven.

Another important object of the invention is the provision of a lubricating system which is so designed that no lubricant can reach the bread slicing knives to thereby taint the bread.

Having in view these objects and others which will be pointed out in the following description, I will now refer to the drawing, in which Figure 1 is a vertical section of the bread slicing machine showing the position of the knives and their operating mechanism.

Figure 2 is a plan view of the bread slicing machine with portions of the cover and chute torn away to disclose the interior structure.

Figure 3 is a view in perspective showing the cam shaft and cams and the device for lubricating the cams.

Figure 4 is a view in perspective showing the stationary shaft for the rocker arms with the lubricating system for lubricating the rocker arms.

Figure 5 is a view in isometric projection and partly in section showing a portion of the guide bar for the bread slicing machine.

Figure 6 is a view in perspective showing a modified form of attaching means for the bread slicing knives.

The frame consists of a base 10, a rear wall 11, a narrow top wall 12 at the rear, a narrow front wall 13 and a curved chute 14 connecting the forward edge of the top wall 12 and the top edge of the front wall 13. The chute is provided with a vertical side wall 15 at its side and with a vertical end wall 16 at its front.

The bread is designed to be placed one loaf after another on the chute so that they will slide down to the front wall 16 where they may be picked up by the attendant. In passing down the chute 14 the loaves are sliced so that they are ready for the wrapper when they reach the front wall 16 of the chute 14. When a series of loaves are passed down the chute 14 the weight of the loaves above will overcome the resistance of the knives but when one loaf at a time is passed down the chute 14 positive means must be employed for forcing the loaves through the knives. The chute 14 is therefore slotted as shown at 17 in Figure 2, these slots being designed for the passage of fingers 18. The fingers 18 are secured to a shaft 19 which is operated manually through a crank handle 20. When either a single loaf is on the chute or when the last loaf of a number of loaves reaches the knives the operator merely pulls forward on the handle 20 to force the loaf through the knives. The fingers 18 are normally positioned below the chute 14 as shown in Figure 1 so that they do not interfere with the movement of the loaf down the chute under the action of gravity.

The knives are driven by means of a motor 21. The pulley 22 of the motor drives the pulley 23 through a belt 24 on the shaft 25. The pulley 26 which is also secured to the shaft 25 is connected by means of a belt 27 to the pulley 28 on the shaft 29. The shaft 29 is equipped with two series of oppositely directed cams 30 and 31 as best shown in Figures 1 and 3.

The knives 32 and 33 are connected at their lower ends to sliding links 34 which in turn are secured to springs 35 and 36, these being in turn anchored at fixed points to the frame of the machine. Their tendency is to draw the knives to their lowermost positions. The machine is equipped with a stationary shaft 37 on which are journalled a plurality of rocker arms 38 and 39 in two series corresponding to the two series of knives. The rocker arms 38 coact with the cams 30 while the rocker arms 39 coact with the cams 31 so that the rocking movements of the rocker arms 38 and 39 are in opposite directions. While the rocker arms 39 are moving upwardly with their knives 32, the rocker arms 38 with their knives 33 are moving downwardly under the action of the springs 35. The reciprocation is therefore very rapid and very quiet.

It is important that the movement of the sliding links 34 be kept in straight lines, this being accomplished by means of the guiding bar 40 which is shown in position in Figure 1 and in fragmentary detail in Figure 5. This includes two bronze bearings 41 having slots 42 positioned between the bronze bearings 41. At 43 are strips of oiled felt or similar material in suitably positioned grooves in the bearings 41. The two bearing members 41 are assembled and held in position through any suitable securing means such as screws or bolts 44 positioned at suitable intervals.

The two angle irons 45 extend transversely across the machine as shown in Figure 1 and they are anchored at their ends to the frame of the machine in any suitable manner. They are spaced apart a distance such that the bearings 41 will seat between them as shown in Figures 1 and 5. The sliding links 34 have reciprocating movement through the slots 42 but the width of the bearings is such that almost no oscillation may occur. The movement of the lower extremities of the knives is therefore in a straight line so that the knives in their movement can depart from the straight line only in their upper extremities at their connection with the rocker arms 38 and 39. Since these rocker arms are relatively short, the arc of the movement of the knives is extremely slight. The position of the springs 35 and 36 below instead of above the knives is very important as it makes possible the guiding and lubricating device in the bearing 41. Were this device positioned above instead of below the knives, the lubricant would be apt to creep down on the knives to be transferred to the bread. In my construction the lubricant will be spread in a thin film over the portion of the sliding links 34 which engages the bearings 41. The film will be too thin to creep upwardly toward the knives, the tendency of the film being to creep downwardly under the action of gravity, thus carrying the lubricant away from the knives rather than toward the knives.

The rocker arms 38 and 39 are journalled to rock on the stationary shaft 37. As shown in Figure 4, the shaft 37 is hollow and it is provided in its upper surface with a plurality of apertures 46 which connect with the hollow interior of the shaft 37. This shaft is kept filled or partly filled with a light lubricant which is carried in minute quantities through wicking to the surface of the shaft through the apertures 46. The rocker arms 38 and 39 are thus automatically kept lubricated. It should be noted that this shaft also is so positioned and designed that no lubricant can creep to the outer ends of the rocker arms 38 and 39 to reach the bread knives.

The smooth running of the machine demands also that the peripheral surfaces of the cams 30 and 31 be kept lubricated. The oil wick container 47 is positioned transversely of the machine immediately in the path of the cams 30 and 31. This container is provided with wicking 48 or similar material, the bottom of the container 47 being kept filled with lubricant. This lubricant is slowly carried through the wicking 48 to apply a thin film of the lubricant to the peripheral surfaces of the cams 30 and 31. It should be noted that this lubricating device is also sufficiently remote from the knives 32 and 33 that no lubricant can creep to the surfaces of the knives.

The knives are made detachable, the links and the rocker arms being both provided with notches for receiving pins which are secured to the knives. In the assembling of the knives in the machine, the knives are first secured to the links and they are then pulled upward against the tension of the springs until they readily seat in the notches of the rocker arms. The assembling is thus an easy matter but the construction is also very useful when the knives are to be replaced for sharpening.

A modification of the knife attaching means is shown in Figure 6. The link 34' and the rocker arm 39' are each provided with buttons which project sufficiently to seat in the keyhole slots 51 of the knife 32'. Since the knife is always more or less under tension, the buttons will remain firmly anchored in the keyhole slots 51 since the buttons are provided with large flat heads and short shanks.

The chute 15 and the knives 32 and 33 cross each other so that in side elevation or in section they are in form of an X the upper portion of which is a V-shaped trough for supporting the loaf which is being sliced. The weight of the loaf of bread is thereby distributed between the chute and the knives. In their movements, the knives move in a path which is the compound of two movements. The lower extremities of the knives are held to straight line reciprocating movements. The upper portions of the knives have a reciprocatory movement which is modified by the oscillating movement about their lower connections as pivots. As the loaf of bread is resting against the chute and against the knives in the trough, it is attacked by the knives in the usual reciprocatory movement but also in a hacking movement against the upper portion of the loaf and in the direction toward the chute.

It will be obvious to anyone skilled in the art that the lubrication system has superior advantages in the present type of bread slicing machine. The links 34 are kept lubricated without any possibility of the lubricant reaching the knives. The cams and rocker arms are both lubricated but the lubrication systems are so remote from the knives that the lubricant cannot reach them. The links 34 with their bearings are also extremely important. In the first place, they prevent any vibration and clattering which would almost certainly result without the use of similar links in connection with the cam and spring operated reciprocating mechanism. In the second place, the only arcuate movement in the knives is at the upper extremity and this movement is through an arc of small radius since the operating portion of the rocker arms is relatively small as compared with the length of the knives. The movement is thus very steady and devoid of all vibration.

Having thus described my invention in such full, clear, and exact terms that its construction and operation will be readily understood by others skilled in the art to which it pertains, what I claim as new and desire to secure by Letters Patent of the United States is:

A bread slicing machine including a forwardly and downwardly inclined chute having a plurality of apertures positioned transversely thereof, a plurality of rearwardly and downwardly inclined knives passing through the apertures of said chute, a transverse shaft below the upper extremities of said knives, a plurality of rocker arms journalled on said shaft, detachable connections between said rocker arms and said knives, cams for actuating said rocker arms for imparting forward and upward movement to said knives, links detachably secured to said knives at the lower extremities thereof, said links being positioned beneath said chute and in close proximity thereto, springs secured to said links for imparting rearward and downward movement to said links and knives, and guides for maintaining straight line reciprocatory movements of said links, the arrangement being such that the loaf of bread being sliced will lie in the trough formed by said chute and said knives to be sliced as a result of the compound movement of the reciprocation and oscillation of said knives.

SANDER DEBUS.